No. 854,629. PATENTED MAY 21, 1907.
M. COOK.
CORN HARVESTER.
APPLICATION FILED NOV. 17, 1905.
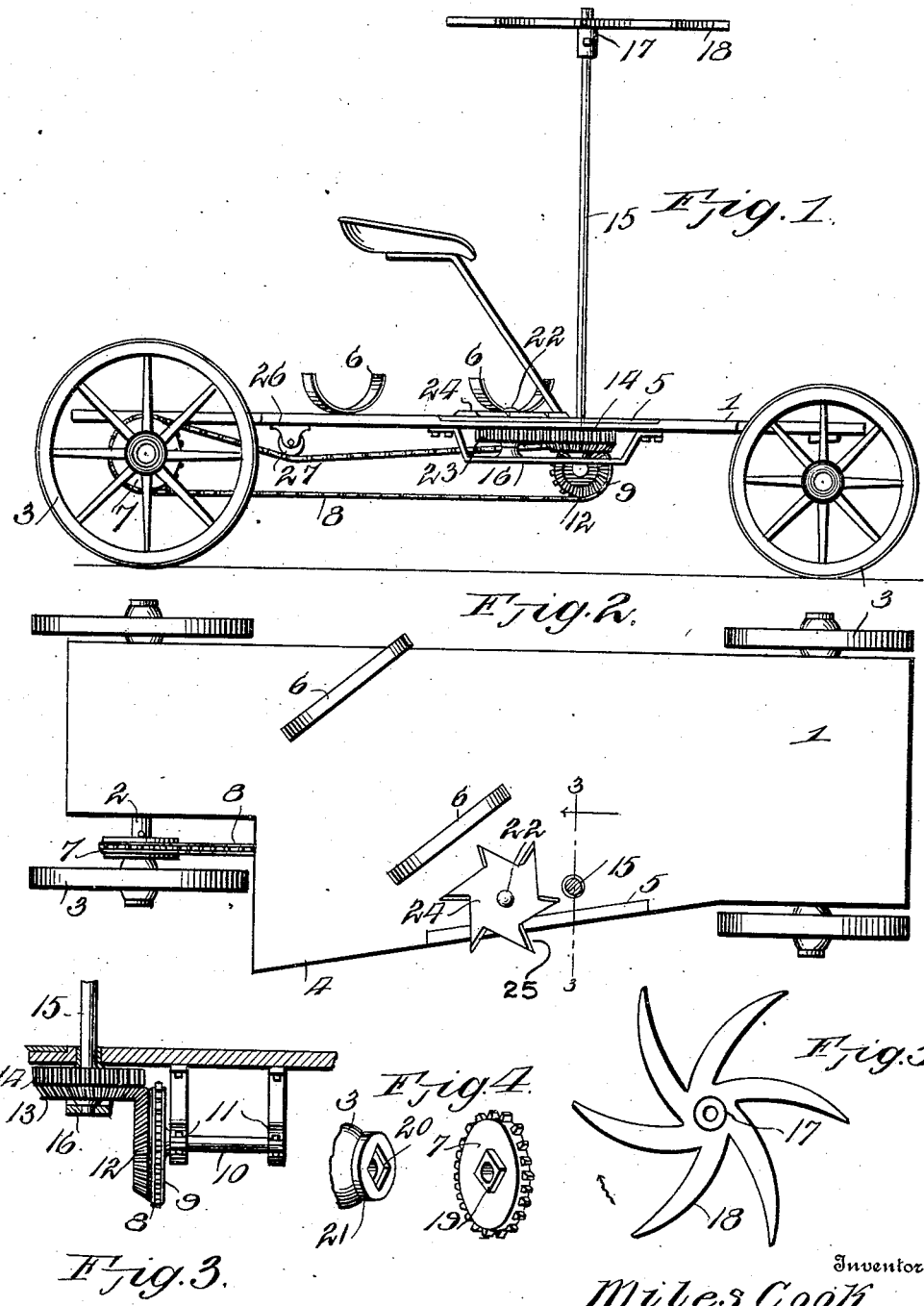
Witnesses
Frank Hough
F. S. Emor
Inventor
Miles Cook
By Victor J. Evans
Attorney

UNITED STATES PATENT OFFICE.

MILES COOK, OF OTTAWA, KANSAS.

CORN-HARVESTER.

No. 854,629.　　　Specification of Letters Patent.　　　Patented May 21, 1907.

Application filed November 17, 1905. Serial No. 287,841.

*To all whom it may concern:*

Be it known that I, MILES COOK, a citizen of the United States, residing at Ottawa, in the county of Franklin and State of Kansas, have invented new and useful Improvements in Corn-Harvesting Machines, of which the following is a specification.

This invention relates to corn harvesting machines embodying in its organization a fixed and a rotary knife, and has for its objects to produce a comparatively simple, inexpensive device of this character in which the movable blade will be positively driven during travel of the machine over the ground, one wherein the stalks will be directed into the path of and to be acted upon by the blade, and one wherein the stalks when cut will be directed onto suitable racks positioned on the table or platform of the machine.

With these and other objects in view, the invention comprises the novel features of construction and combination of parts more fully hereinafter described.

In the accompanying drawings: Figure 1 is a side elevation of a harvesting machine embodying the invention. Fig. 2 is a top plan view of the same. Fig. 3 is a detail section on an enlarged scale taken on the line 3—3 of Fig. 2. Fig. 4 is a detail, perspective view of a portion of one of the ground wheels and the adjacent sprocket wall. Fig. 5 is a top plan view of the stalk collecting and guiding member.

Referring to the drawings, it will be seen that the machine comprises a horizontal table or platform 1 mounted at its ends upon axles 2 equipped with rotary transporting wheels 3, the platform being extended at one side of the machine beyond the line of the wheels 3 and having an outwardly and rearwardly inclined edge 4 adjacent the longitudinal center of which there is secured a fixed cutting member or blade 5, while disposed on a diagonal line across the table is a pair of relatively spaced, substantially U-shaped stalk receiving racks 6 fixed to arise vertically from the table.

Mounted on the rear shaft or axle 2 is a sprocket wheel 7 connected by a chain 8 with a sprocket 9 fixed upon a rotary stub shaft 10 journaled in suitable bearings 11 beneath the platform and having a toothed bevel portion 12 in mesh with the toothed beveled portion 13 of a gear 14 fixed upon the lower end of a rotary vertical rod or shaft 15 stepped at its lower end in a bearing member 16 beneath the table 1 and extended upward through a suitable bearing opening in the latter, there being mounted for vertical adjustment on the shaft 15 a stalk collecting member or disk 17 having outwardly projecting stalk engaging portions or arms 18 while formed on the sprocket 7 is a square or other non-circular projecting portion or hub 19 designed to fit in a correspondingly shaped socket 20 formed in the hub 21 of the adjacent wheel 3, whereby the sprocket will be driven by the latter during travel of the machine over the ground.

Journaled in suitable bearing openings in the platform 1 and bearing member 16 is a stub shaft 22 having fixed thereon a gear 23 in mesh with the gear 14, there being fixed upon the shaft 22 to rotate in a horizontal plane over the knife 5 a movable knife 24 preferably of star form, as shown, to present projecting cutting portions or blades 25, it being noted that during travel of the machine the sprocket 9 will be driven for imparting motion to the gears 14 and 23 and through the medium of said gears to the collecting member and movable knife.

Fixed at a suitable point beneath the platform 1 is a bearing 26 in which is journaled a tension roller 27 disposed to bear upon the chain 8 for properly tensioning the same on the sprockets 7 and 9.

In practice, as the machine advances over the ground, the sprocket 9 will be driven through the medium of the sprocket 7 and chain 8 and will impart motion to the knife 24 and stalk collecting member as heretofore explained. As the shaft 15 revolves the arms 18 of the member 17 will engage and direct the stalks into the path of the revolving knife 24, whereby the blades 25 of the latter will coöperate with blade 5 for cutting the stalks, as will be understood, the stalks, when cut, being thrown by means of the member 17 onto the racks 6 in which they will be accumulated to be tied into bundles and thereafter deposited onto the ground.

It is to be noted that as the machine advances and owing to the edge 4 of the table being extended beyond the wheels, the said edge will contact with the stalks which will ride along said edge to be properly acted upon by the knives and that the knives are so positioned on the projecting edge of the table as to properly act upon the stalks during their travel along said edge.

Having thus described my invention, what I claim is:

In a corn harvesting machine, a table mounted on transporting wheels and projected at one side transversely beyond the wheels, the outer edge of the projecting portion of the table being outwardly and rearwardly inclined and adapted to contact with the row of stalks to be cut, a knife fixed on the projecting portion of the table at a point adjacent the middle of the inclined edge, a shaft journaled for rotation on the table near said knife and carrying a rotary knife adapted for coöperation with the fixed knife to cut the stalks, a second rotary shaft rising vertically from the table, a collecting member carried by the second shaft and having arms adapted to engage the stalks and direct them into the path of the rotary knife, gear connections between the shafts for rotating the same in relatively reverse directions, bearings beneath the table, a stub shaft journaled in said bearings and having gear connection, with one of the first named shafts, and connections between one of the transporting wheels and stub shaft for driving the latter to transmit motion to the rotary knife and collecting member.

MILES COOK.

Witnesses:
 EZRA COOK,
 FRANK MUTH.